United States Patent
Kang et al.

(10) Patent No.: US 6,896,639 B2
(45) Date of Patent: May 24, 2005

(54) PREVENTION OF SLIPPAGE IN BELT-TYPE CONTINUOUSLY VARIABLE TRANSMISSION

(75) Inventors: Jihoon Kang, Shizuoka (JP); Yasutaka Kawamura, Shizuoka (JP); Tatsuo Ochiai, Shizuoka (JP); Hirofumi Okahara, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/651,243

(22) Filed: Aug. 29, 2003

(65) Prior Publication Data

US 2004/0127332 A1 Jul. 1, 2004

(30) Foreign Application Priority Data

Sep. 2, 2002 (JP) ........................................ 2002-256463

(51) Int. Cl.$^7$ ........................... B60K 41/12; B60K 41/04
(52) U.S. Cl. ......................................... 477/44; 477/107
(58) Field of Search ............................ 477/44–45, 107, 477/109, 111; 475/208–209

(56) References Cited

U.S. PATENT DOCUMENTS

| | | | |
|---|---|---|---|
| 5,042,324 A | * | 8/1991 | Suzuki ....................... 477/109 |
| 5,820,514 A | | 10/1998 | Adachi |
| 6,168,546 B1 | * | 1/2001 | Loffler et al. ................ 477/109 |
| 6,454,675 B2 | * | 9/2002 | Asayama et al. ............. 477/45 |
| 6,684,142 B2 | * | 1/2004 | Janssen et al. .............. 477/107 |
| 2001/0023216 A1 | * | 9/2001 | Bolz et al. .................... 477/44 |

* cited by examiner

Primary Examiner—Roger Pang

(74) Attorney, Agent, or Firm—Foley & Lardner LLP

(57) ABSTRACT

A vehicle engine (70) is connected with a belt-type continuously variable transmission (1) via a clutch (32). The transmission (1) transmits torque via a belt (43) between a pair of pulleys (41, 42), and varies the transmission torque according to a supply of oil pressure. The clutch (32) engages by means of oil pressure supplied as a shift lever is changed over from a neutral range to a drive range. An oil pressure supplying device (10, 44, 45, 46) supplies the oil pressure required to transmit torque between the belt (43) and the pulleys (41, 42), and the oil pressure for engaging the clutch (32). Slippage between the belt (43) and the pulleys (41, 42) is prevented during engagement of the clutch (32) by restricting the output torque of the engine (70) over a predetermined period of time.

5 Claims, 4 Drawing Sheets

PREVENTION OF SLIPPAGE IN BELT-TYPE CONTINUOUSLY VARIABLE TRANSMISSION

FIELD OF THE INVENTION

This invention relates to preventing slippage in the belt of a belt-type continuously variable transmission for use in a vehicle.

BACKGROUND OF THE INVENTION

U.S. Pat. No. 5,820,514 discloses a belt-type continuously variable transmission (hereinafter referred to as belt CVT) for use in a vehicle.

The belt CVT comprises a primary pulley for inputting the drive force of an engine, a secondary pulley for outputting the drive force to a drive wheel, and a V-belt that is wrapped around the primary pulley and secondary pulley. In the primary pulley and secondary pulley, pulley grooves for accepting the belt are each varied in width by oil pressure. Changes in the width of the pulley grooves change the contact radius between the V-belt and the pulley, which results in changing the rotation speed ratio of the primary pulley and the secondary pulley, or in other words the speed ratio of the transmission.

The output rotation of the engine is transmitted to the primary pulley via a torque converter and a forward/reverse change-over mechanism.

The forward/reverse change-over mechanism comprises a forward clutch that is engaged during forward travel of the vehicle, or in other words when the driver places a shift lever in a drive range (D), and a reverse clutch that is engaged during reverse travel, or in other words when the driver places the shift lever in the reverse range (R). When the shift lever is in the neutral range (N), both of these clutches are released, and the output rotation of the engine is not transmitted to the primary pulley. These clutches are engaged by means of oil pressure, and the clutches are released from an engaged state by the release of oil pressure into a drain.

SUMMARY OF THE INVENTION

In this type of belt CVT, when the shift lever is moved from the drive range (D) to the neutral range (N) and then back to the drive range (D) during vehicle travel, the oil pressure engaging the forward clutch is released all at once into the drain and is thus reduced, and oil pressure is subsequently re-supplied to the forward clutch for the engagement thereof.

Meanwhile, the primary pulley and secondary pulley of the belt CVT require a constant oil pressure in order to prevent slippage in the V-belt while maintaining the present groove width, regardless of whether a change in speed ratio has been directed.

Because oil pressure is usually supplied by the same oil pressure supply unit, the oil pressure supplied to the belt CVT temporarily decreases due to the effect of supplying oil pressure to the forward clutch when an operation is performed whereby the shift lever is moved from the drive range (D) to the neutral range (N), and then back to the drive range (D) during vehicle travel. As a result, the power by which the pulley holds the V-belt can be insufficient for the rotation torque of the engine that is input to the primary pulley during the change-over from the neutral range (N) to the drive range (D), and slippage can occur between the pulley and the V-belt. V-belt slippage is especially likely to occur when the accelerator pedal is depressed following re-selection of the drive range (D) since the input torque to the primary pulley suddenly increases. This type of slippage in a V-belt consisting of a metal member contributes to impaired durability of the V-belt.

It is therefore an object of this invention to prevent slippage in a belt-type continuously variable transmission accompanying an operation of a shift lever during vehicle travel.

In order to achieve the above object, this invention provides a vehicle drive train comprising an engine, a continuously variable transmission comprising a pair of pulleys that are mutually connected via a belt wherein the continuously variable transmission varies torque transmitted between the pulleys via the belt according to a supplied oil pressure, a clutch which connects the engine to one of the pair of pulleys by engaging in accordance with a supplied oil pressure wherein the oil pressure is supplied to the clutch and continuously variable transmission from an identical oil pressure source, a drive wheel connected to the other of the pair of pulleys, and an engine output regulating mechanism which reduces an output torque of the engine when the clutch is engaged.

The details as well as other features and advantages of this invention are set forth in the remainder of the specification and are shown in the accompanying drawings.

DESCRIPTION OF THE PREFERRED EMBODIMENTS

Figure 1:
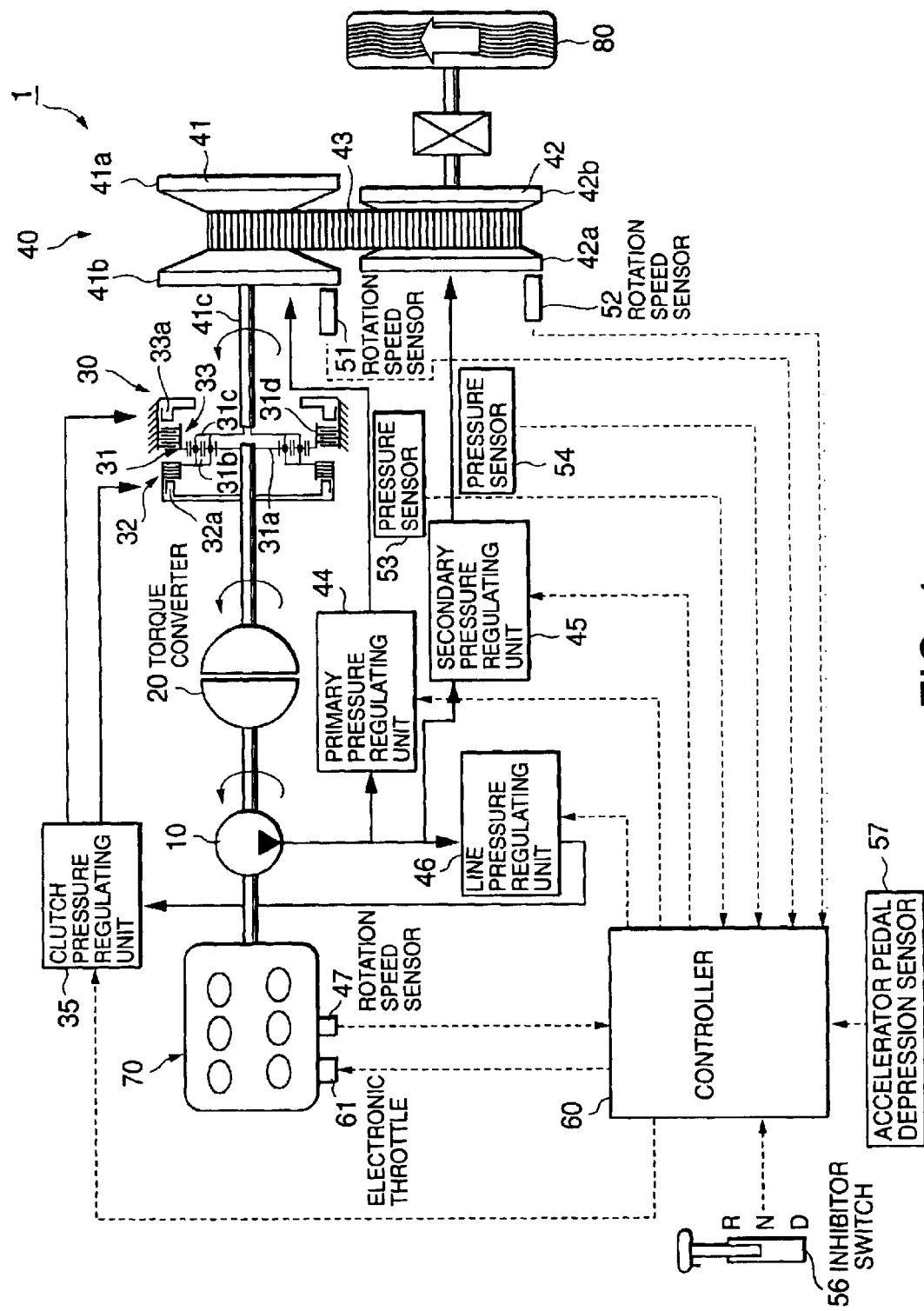
FIG. 1 is a schematic diagram of a drive train control device for a vehicle according to this invention.

Referring to FIG. 1 of the drawings, a belt CVT 1 for use in a vehicle comprises a primary pulley 41, a secondary pulley 42, and a V-belt 43 wrapped around the pulleys 41 and 42.

The primary pulley 41 comprises a fixed conical plate 41a and a movable conical plate 41b disposed facing each other. The V-belt 43 catches in a pulley groove that is V-shaped in cross-section and is formed between the fixed conical plate 41a and the movable conical plate 41b. The movable conical plate 41b moves in response to a primary pressure supplied via a primary pressure regulating unit 44 to vary the width of the pulley groove and the contact radius between the V-belt 43 and the primary pulley 41. The movable conical plate 41b is fixed to an input shaft 41c. The output rotation of an engine 70 mounted in the vehicle is input to the input shaft 41c via a torque converter 20 and a forward/reverse change-over mechanism 30.

The secondary pulley 42 comprises a movable conical plate 42a and a fixed conical plate 42b disposed facing each other. The V-belt 43 catches in a pulley groove that is V-shaped in cross-section and is formed between the movable conical plate 42a and the fixed conical plate 42b. The movable conical plate 42a moves in response to a secondary pressure supplied via a secondary pressure regulating unit 45 to vary the width of the pulley groove and the contact radius between the V-belt 43 and the secondary pulley 42. The rotation of the fixed conical plate 42b is transmitted to a drive wheel 80 of the vehicle. The pressure-receiving surface area of the movable conical plate 41b and movable conical plate 42a are set to be substantially equal.

The torque converter 20 is a publicly known mechanism for transmitting the rotation of the engine 70 by means of the flow of oil between a pump impeller and a turbine liner. The torque converter 20 comprises a lockup device for causing the pump impeller to rotate in integrated fashion with the turbine liner.

The forward/reverse change-over mechanism 30 comprises a planetary gear set 31, a forward clutch 32, and a reverse clutch 33. The planetary gear set 31 comprises an external sun gear 31a, and an internal ring gear 31d disposed on the outside thereof. A plurality of pinions 31b that mesh with the outside perimeter of the sun gear 31a and the inside perimeter of the ring gear 31d and a carrier 31c for supporting the pinions 31b are furthermore comprised therein. The sun gear 31a is connected to an output shaft of the torque converter 20, and the carriers 31c are connected to the input shaft 41c of the primary pulley 41.

The forward clutch 32 connects the carrier 31c with the sun gear 31a according to oil pressure supplied to a clutch piston chamber 32a from a clutch pressure regulating unit 35. As a result, the output rotation of the torque converter 20 is transmitted as is to the input shaft 41c of the primary pulley 41 via the sun gear 31a and carrier 31c.

The reverse clutch 33 locks the rotation of the ring gear 31d according to the oil pressure supplied to a clutch piston chamber 33a from the clutch pressure regulating unit 35. As a result, the sun gear 31a and carrier 31c rotate in opposite directions, and the output rotation of the torque converter 20 is transmitted to the input shaft 41c of the primary pulley 41 in reverse.

The forward clutch 32 and reverse clutch 33 are engaged exclusively. Specifically, the reverse clutch 33 is invariably released when the forward clutch 32 is engaged, and the forward clutch 32 is invariably released when the reverse clutch 33 is engaged. In a state in which the forward clutch 32 and reverse clutch 33 are both released, the sun gear 31a and carrier 31c rotate relative to each other in arbitrary fashion.

Oil pressure is supplied to the primary pressure regulating unit 44, secondary pressure regulating unit 45, and clutch pressure regulating unit 35 from an oil pressure pump 10 driven by the engine 70. The discharge pressure of the oil pressure pump 10 is regulated to a predetermined line pressure by means of a line pressure regulating unit 46, and is distributed to the primary pressure regulating unit 44, secondary pressure regulating unit 45, and clutch pressure regulating unit 35. The primary pressure regulating unit 44 furthermore regulates the line pressure to a predetermined primary pressure to operate the movable conical plate 41b of the primary pulley 41. The secondary pressure regulating unit 45 furthermore regulates the line pressure to a predetermined secondary pressure to operate the movable conical plate 42a of the secondary pulley 42. The line pressure of the clutch pressure regulating unit 35 is regulated to a predetermined clutch pressure, and is selectively supplied to the forward clutch 32 and reverse clutch 33.

The primary pressure regulating unit 44, secondary pressure regulating unit 45, and line pressure regulating unit 46 respectively regulate the primary pressure, secondary pressure, and line pressure according to command signals from a controller 60.

The clutch pressure regulating unit 35 supplies the oil pressure used for engaging a particular clutch according to the command signal from the controller 60.

The controller 60 is composed of a microcomputer that comprises a central processing unit (CPU), read-only memory (ROM), random access memory (RAM), and an input/output interface (I/O interface). The controller may also be composed of a plurality of microcomputers.

The controller 60 controls the primary pressure, secondary pressure, and line pressure, and engages and releases the forward clutch 32 and reverse clutch 33. The controller 60 also controls the output torque of the engine 70 by outputting an engine control signal to an electronic throttle 61 provided in the engine 70.

Detected data from a rotation speed sensor 47 for detecting the rotation speed of the engine 70, a rotation speed sensor 51 for detecting the rotation speed of the primary pulley 41, a rotation speed sensor 52 for detecting the rotation speed of the secondary pulley 42, a pressure sensor 53 for detecting the primary pressure, a pressure sensor 54 for detecting the secondary pressure, an inhibitor switch 56 for detecting the selected position of the shift lever provided to the vehicle, and an accelerator pedal depression sensor 57 for detecting the amount of depression of the accelerator pedal provided in the vehicle are input as signals to the controller 60 to serve as parameters for controlling these actions. The shift lever is provided with a drive range (D) used for forward travel, a reverse range (R) used for reverse travel, and a neutral range (N) in which the rotation torque of the engine 70 is not transmitted to the drive wheel.

Because the secondary pulley 42 is connected with drive wheel 80, the rotation speed of the secondary pulley 42 detected by the rotation speed sensor 52 is utilized as a parameter for indicating the vehicle speed.

The controller 60 performs publicly known control relating to the operation of the forward clutch 32 and reverse clutch 33 of the forward/reverse change-over mechanism 30 according to the range selection of the shift lever, and relating to the speed ratio of the publicly known belt CVT 1, which is controlled by the primary pressure and secondary pressure. Furthermore, the controller 60 limits the output torque of the engine 70 so that no slippage occurs in the V-belt 43 when the shift lever is operated from the drive range (D) to the neutral range (N) and from the neutral range (N) to the drive range (D) within a short amount of time during vehicle travel, as previously described.

Figure 2A:
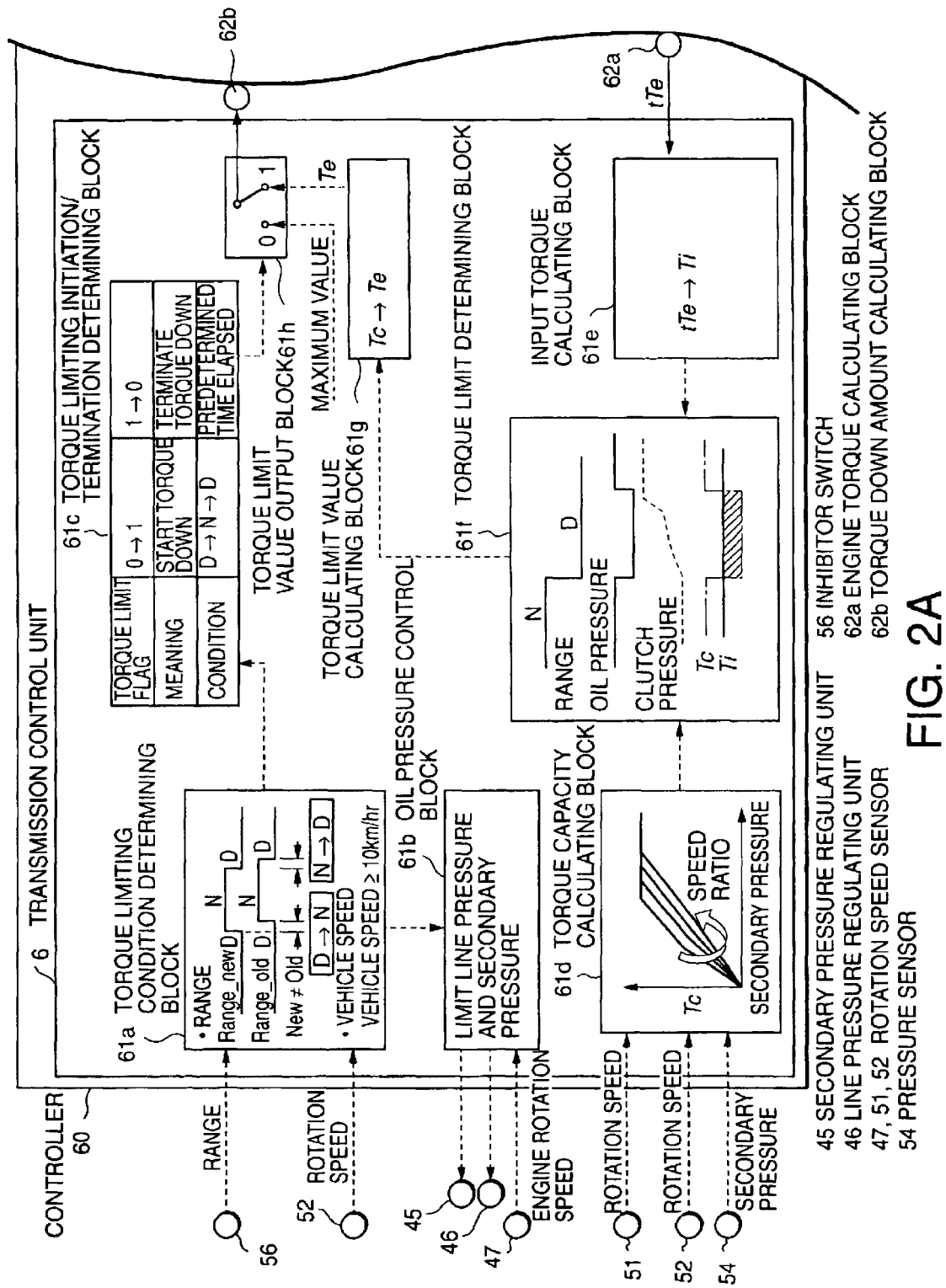
FIGS. 2A and 2B are block diagrams depicting the configuration of a controller according to this invention.
Figure 2B:
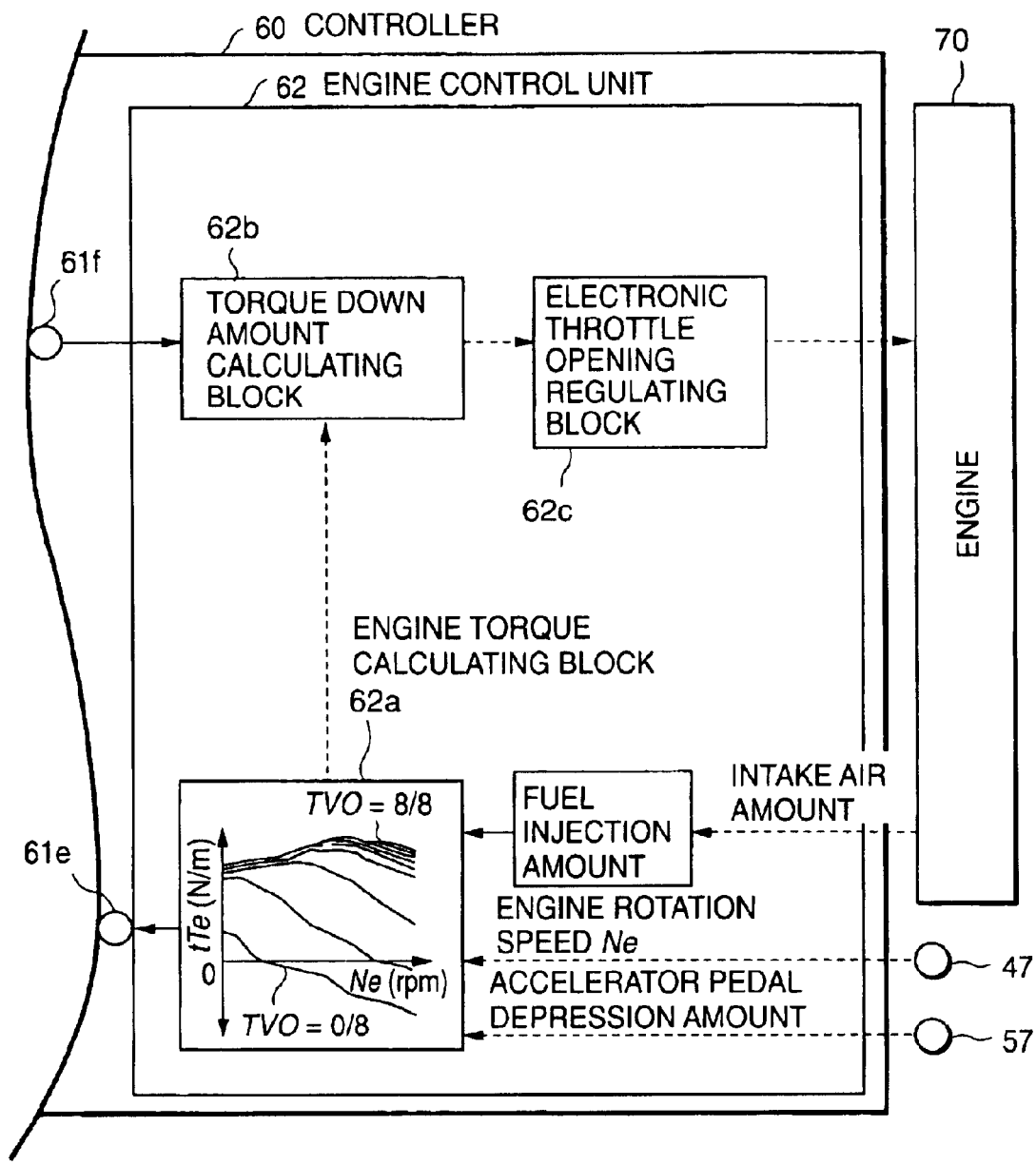

Referring to FIGS. 2A and 2B, the functioning of the controller 60 for limiting the output torque will now be described.

The controller 60 comprises a transmission control unit 61 and an engine control unit 62.

The transmission control unit 61 is composed of a torque-limiting condition determining block 61a, an oil pressure controlling block 61b, a torque limiting initiation/termination determining block 61c, a torque capacity calculating block 61d, an input torque calculating block 61e, a torque limit determining block 61f, a torque limit value calculating block 61g, and a torque limit value output block 61h.

The engine control unit 62 is composed of an engine torque calculating block 62a, a torque-down amount calculating block 62b, and an electronic throttle opening regulating block 62c.

The units and blocks depicted in the drawings are hypothetical units/blocks depicting functions of the controller 60, and do not exist physically.

The torque-limiting condition determining block 61a determines whether torque-limiting conditions are established based on the selected range input from the inhibitor switch 56 and on the rotation speed of the secondary pulley 42 input from the rotation speed sensor 52. Torque limiting conditions are established when the selected range of the shift lever shifts from the neutral range to the drive range at a vehicle speed that is at or above a set vehicle speed. The set vehicle speed is set in this case at ten kilometers per hour. The torque-limiting condition is not satisfied when the vehicle speed is less than ten kilometers per hour, because the vehicle start-up performance will be adversely affected, if the output torque of the engine 70 is limited to a vehicle speed less than ten kilometers per hour.

The oil pressure controlling block 61b limits the line pressure and secondary pressure over a predetermined time period to pressures that the oil pressure pump 10 is capable of generating. The line pressure is limited in order to maintain the engaging pressure of the forward clutch 32, and the secondary pressure is limited so as to prevent the speed ratio of the belt CVT 1 from increasing, or in other words to prevent the output rotation of the belt CVT 1 from decreasing. Limiting the line pressure results in limiting the primary pressure. As a result, the primary pressure is maintained at a low pressure over a predetermined time period after the selected range of the shift lever is changed over from the neutral range to the drive range, as depicted in the drawing of the torque limit determining block 61f.

The torque limiting initiation/termination determining block 61c sets a torque limit flag to unity when torque limiting conditions are established based on the determination results of the torque limiting-condition determining block 61a, and resets the torque limit flag to zero when torque limiting conditions are not established. The initial value of the torque limit flag is zero.

The torque capacity calculating block 61d calculates the speed ratio of the belt CVT 1 from the rotation speed of the primary pulley 41 and rotation speed of the secondary pulley 42. Furthermore, the maximum torque that would not cause the belt 43 to slip against the primary pulley 41 and secondary pulley 42 is calculated based on the speed ratio and the secondary pressure detected by the pressure sensor 54. This value is labeled as the torque capacity Tc.

The input torque calculating block 61e sets the actual engine torque Te input from the engine control unit 62 as the input torque Ti of the belt CVT 1.

The torque limit determining block 61f compares the input torque Ti and torque capacity Tc of the belt CVT 1, and determines that torque limiting is necessary for the input torque Ti when the torque capacity Tc falls below the input torque Ti, as shown by the shaded area in the figure.

The torque limit value calculating block 61g limits the input torque Ti to the torque capacity Tc when it is necessary to limit the input torque.

The torque limit value output block 61h outputs a torque limit requirement value that is in accordance with the torque limit flag to the torque-down amount calculating block 62b. When the torque limit flag is at zero, a maximum value for the torque limit requirement value is output to the torque-down amount calculating block 62b as the torque limit requirement value. Herein the maximum value denotes that no torque limitation is required. When the torque limit flag is at unity, the input torque Ti calculated by the torque limit value calculating block 61g is output as the torque limit requirement value to the torque-down amount calculating block 62b.

The engine torque calculating block 62a of the engine control unit 62 calculates the throttle valve opening TVO of the engine 70 from the amount of depression of the accelerator pedal, and calculates the output torque of the engine 70 from the throttle valve opening TVO, fuel injection amount of the engine 70, and rotation speed of the engine 70, with reference to a map having characteristics such as those shown in the figure. If the controller 60 also controls the fuel injection amount of the engine 70, the controller 60 is capable of obtaining the fuel injection amount from data that are stored therein.

The torque-down amount calculating block 62b calculates a torque-down amount on the basis of the torque limit requirement value that is input from the torque limit value output block 61h and the output torque of the engine 70 calculated by the engine torque calculating block 62a.

The electronic throttle valve opening regulating block 62c narrows the valve opening of the electronic throttle 61 according to the torque-down amount.

Figure 3:
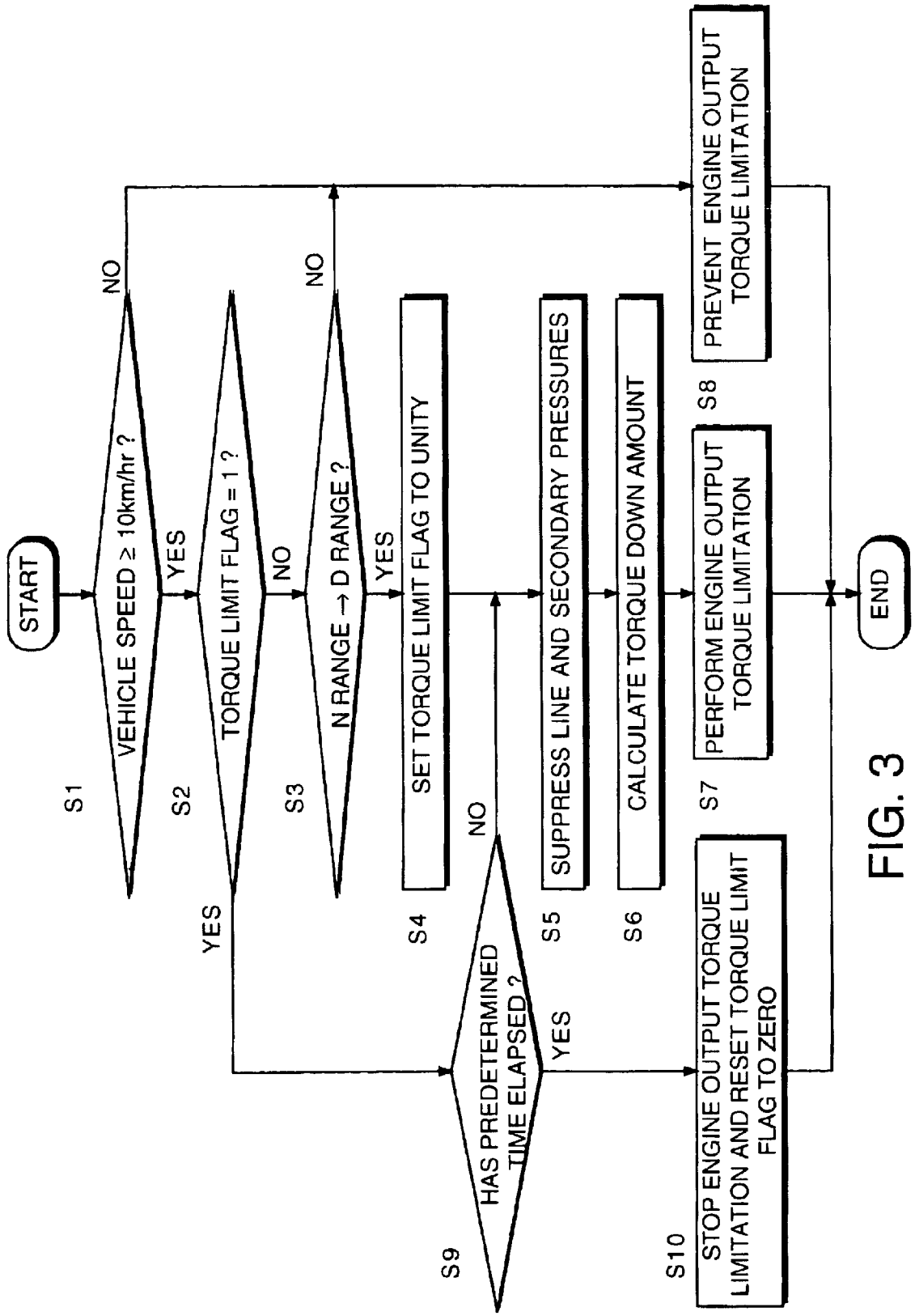
FIG. 3 is a flow chart describing an engine output torque regulation routine executed by the controller.

Next, referring to FIG. 3, a routine executed according to the above configuration whereby the controller 60 prevents belt slippage in the belt CVT 1 will be described. This routine is executed at intervals of ten milliseconds during operation of the engine 70.

First, in a step S1, the controller 60 determines whether the vehicle speed is at or above the previously described set vehicle speed of ten kilometers per hour on the basis of the rotation speed of the secondary pulley 42 detected by the rotation speed sensor 52. When the vehicle speed is under ten kilometers per hour, the controller 60 determines that limiting of the output torque of the engine 70 will not be performed in a step S8, and the routine is terminated.

When the vehicle speed is at or above ten kilometers per hour, the controller 60 determines in a step S2 whether the torque limit flag is at unity. When the torque limit flag is not at unity, the controller 60 performs the processing of a step S3.

In the step S3, the controller 60 determines whether the shift lever has been changed over from the neutral range (N) to the drive range (D). This determination is performed by comparing the input signal from the inhibitor switch 56 with the previous input signal at fixed time intervals. If the shift lever has not been changed over from the neutral range (N) to the drive range (D), the controller 60 determines that limiting of the output torque of the engine 70 will not be performed in the step S8, and the routine is terminated.

When the shift lever has been changed over from the neutral range (N) to the drive range (D), the controller 60 sets the torque limit flag to unity in a step S4.

Next, in a step S5, the controller 60 limits the line pressure and secondary pressure to pressures that the oil pressure pump 10 is capable of generating.

The controller 60 furthermore calculates the torque-down amount in a subsequent step S6.

In a subsequent step S7, the controller 60 limits the output torque of the engine 70 on the basis of the torque-down amount. The controller 60 terminates the routine after the process in the step S7.

On the other hand, in the step S2, when the torque limit flag is at unity, the controller 60 determines whether a predetermined period of time has elapsed since the torque limit flag was set to unity in a step S9. If the predetermined period of time has not elapsed, the controller 60 executes the processing beginning in the step S5.

When the predetermined period of time has elapsed, the controller 60 stops limiting the output torque of the engine 70 in a step S10, the torque limit flag is set to zero, and the routine is terminated. The predetermined period of time corresponds to the time required for torque limiting to become unnecessary after changing over from the neutral range (N) to the drive range (D), and is determined experientially in advance.

By executing this routine, the output torque of the engine 70 is limited over the predetermined period of time when the shift lever is changed over from the neutral range (N) to the drive range (D) while the vehicle is traveling at or above the predetermined vehicle speed.

In the routine described above, the steps S1 through S3 and the step S9 correspond to the functioning of the torque-limiting condition determining block 61a, the step S4 corresponds to the functioning of the torque limiting initiation/termination determining block 61c, the step S5 corresponds to the functioning of the oil pressure controlling block 61b, and the step S6 corresponds to the functioning of the torque capacity calculating block 61d, input torque calculating block 61e, torque limit determining block 61f, torque limit value calculating block 61g, engine torque calculating block 62a, and torque-down amount calculating block 62b. The step S7 corresponds to the functioning of the throttle valve opening regulating block 62c, and the steps S8 and S10 correspond to the functioning of the torque limit value output block 61h.

During changing over from the neutral range (N) to the drive range (D), the oil pressure which acts upon the primary pulley 41 and secondary pulley 42 is reduced in order to maintain the engaging pressure of the forward clutch 32. However, the primary pulley 41 and secondary pulley 42 are able even in this case to maintain the necessary holding force to prevent the input torque Ti input to the belt CVT 1 from the engine 70 from exceeding the torque capacity Tc, and the belt 43 from slipping. Also, when the accelerator pedal is depressed during changing over from the neutral range (N) to the drive range (D), the belt 43 does not slip because the torque Ti that is input to the belt CVT 1 from the engine 70 is controlled so as not to exceed the torque capacity Tc.

Also, because the output torque of the engine 70 is limited only for the predetermined period of time based on the torque capacity that is calculated based on the actual speed ratio and primary pressure, limiting of the output torque of the engine can be kept to the required minimum.

The contents of Tokugan 2002-256463, with a filing date of Sep. 2, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the predetermined vehicle speed is set to ten kilometers per hour in this embodiment, but can be changed to any speed according to the specifications of the engine or belt CVT to which the invention is applied.

In the embodiment thus described, changing over of the shift lever from the neutral range to the drive range is detected by the inhibitor switch 56, and the vehicle speed is detected by the rotation speed sensor 54 in order to determine whether the torque limiting condition is established. The speed ratio calculated from the speed detected by the rotation speed sensors 53 and 54, and the secondary pressure detected by the pressure sensor 54 are used to calculate the torque capacity of the belt CVT 1. The engine rotation speed is detected by the rotation speed sensor 47, the valve opening of the electronic throttle 61 is detected from the accelerator pedal depression amount sensor 57, and the fuel injection amount of the engine 70 is obtained from data stored within the controller 60 in order to calculate the output torque of the engine 70. The parameters for these controls can, however, be detected or calculated by various other means. This invention can be applied to any vehicle drive train device that uses the above parameters to control the claimed engine output torque, independent of the method used to acquire the parameters.

The embodiments of this invention in which an exclusive property or privilege is claimed are defined as follows:

What is claimed is:

1. A vehicle drive train comprising:
   an engine;
   a continuously variable transmission comprising a pair of pulleys that are mutually connected via a belt, wherein the continuously variable transmission varies torque transmitted between the pulleys via the belt according to a supplied oil pressure;
   a clutch which connects the engine to one of the pair of pulleys by engaging in accordance with a supplied oil pressure, wherein the oil pressure is supplied to the clutch and continuously variable transmission from an identical oil pressure source;
   a drive wheel connected to the other of the pair of pulleys; and
   an engine output regulating mechanism which reduces an output torque of the engine when the clutch is engaged, wherein the clutch is engaged by changing over a shift lever of the vehicle from a neutral range to a drive range, and wherein the engine output regulating mechanism further comprises a sensor which detects a change-over of the shift lever from a neutral range to a drive range, a sensor which detects a travel speed of the vehicle, and a programmable controller programmed to reduce the output torque of the engine when the shift lever is shifted from the neutral range to the drive range while the vehicle is traveling at or above a predetermined speed.

2. The vehicle drive train device as defined in claim 1, wherein the engine output regulating mechanism further comprises a sensor which detects a speed ratio of the continuously variable transmission and a sensor which detects an oil pressure supplied to the continuously variable transmission, and the controller is further programmed to calculate a maximum transmitted torque that can be transmitted between the pulleys via the belt on the basis of the speed ratio and the oil pressure supplied to the continuously variable transmission, and to reduce the output torque of the engine so as not to exceed the maximum transmitted torque.

3. The vehicle drive train device as defined in claim 1, wherein the controller is further programmed to reduce the output torque of the engine within a predetermined period of time when the shift lever is changed over from the neutral range to the drive range while the vehicle is traveling at or above the predetermined speed.

4. The vehicle drive train device as defined in claim 1, wherein the engine output regulating mechanism further comprises a throttle for regulating an intake airflow amount of the engine, and the controller is further programmed to restrict the output torque of the engine by reducing an opening of the throttle.

5. The vehicle drive train device as defined in claim 1, wherein the controller is further programmed to reduce the oil pressure supplied to the continuously variable transmission within a predetermined period of time when the shift lever is shifted from the neutral range to the drive range while the vehicle is traveling at or above the predetermined speed.

* * * * *